(12) United States Patent
Quintus

(10) Patent No.: US 6,217,470 B1
(45) Date of Patent: Apr. 17, 2001

(54) BELT TENSIONER WITH INCREASED BUSHING SURFACE

(75) Inventor: James G. Quintus, Springfield, MO (US)

(73) Assignee: Dayco Products, Inc., Dayton, OH (US)

( * ) Notice: Subject to any disclaimer, the term of this patent is extended or adjusted under 35 U.S.C. 154(b) by 0 days.

(21) Appl. No.: 09/374,756

(22) Filed: Aug. 13, 1999

(51) Int. Cl.[7] .............................. F16H 7/12; F16H 7/08
(52) U.S. Cl. .................... 474/135; 474/101; 474/117; 474/133
(58) Field of Search ............................. 474/101, 112, 474/111, 110, 133–135, 140, 115, 113, 138

(56) References Cited

U.S. PATENT DOCUMENTS

| | | |
|---|---|---|
| 3,924,483 | 12/1975 | Walker et al. ........................ 74/242 |
| 4,473,362 | 9/1984 | Thomey et al. ..................... 474/135 |
| 4,596,538 * | 6/1986 | Henderson ........................... 474/135 |
| 4,696,663 | 9/1987 | Thomey et al. ..................... 474/133 |
| 4,725,260 * | 2/1988 | Komorowski et al. .............. 474/135 |
| 4,886,484 * | 12/1989 | Hanes .................................. 474/135 |
| 4,938,734 * | 7/1990 | Green et al. ........................ 474/135 |
| 5,131,889 * | 7/1992 | Meckstroth et al. ................ 474/135 |
| 5,545,095 * | 8/1996 | Henderson ........................... 474/135 |

* cited by examiner

Primary Examiner—David A. Bucci
Assistant Examiner—Marcus Charles
(74) Attorney, Agent, or Firm—Joseph V. Tassone

(57) ABSTRACT

A belt tensioner includes a stationary bracket mounted at the front of an engine and a pivotal arm operatively connected to the bracket and forming a plurality of channels with respective supporting surfaces of the bracket. The channels receive a plurality of bushings so as to increase an overall supporting surface of the belt-tensioner.

17 Claims, 4 Drawing Sheets

BELT TENSIONER WITH INCREASED BUSHING SURFACE

FIELD OF THE INVENTION

This invention relates to a device for automatically applying tension to a drive belt used in conjunction with rotating accessories mounted on a vehicular engine. More particularly, the invention relates to the belt tensioner designed to have an increased bushing surface between stationary and displaceable parts of the device.

BACKGROUND OF THE INVENTION

It is known to utilize a tensioning device to effectively operate a variety of rotating accessories operatively connected with and driven by an engine. In order to maintain reliable and efficient operation of the accessories, the tension of the belt should be maintained at a level sufficient to prevent slipping of the belt over various pulleys upon which the belt is trained.

Consequences of the slippage of the belt can be undesirable. Particularly, slippage can be disastrous in case of the chains used to drive an engine's valve gear. The slipping of accessory drive belts used for the purpose of providing power to such engine accessories as a power steering pump, air conditioning compressor and many others, while not producing catastrophic results, still leads to its inefficient operation and is accompanied by undesirable squealing and chirping noises. Accordingly, the need for belt tensioning under such circumstances has been recognized for many years.

Typical in many respects of the known prior art, a belt tensioner shown in FIG. 1 includes a stationary bracket 8' and a pivotal arm 5' functioning as a pulley support. The illustrated device is negatively affected by a few drawbacks. First of all, because the tensioning device is secured to the engine, the attaching structure lacks rigidity and as a result may have vibration characteristics which are far from being ideal. This, in turn, leads to unsatisfactory rigidity of the structure which negatively affect the tensioning of the belt.

The device shown in FIG. 1 is particularly unsatisfactory because it has a very limited supporting surface between the arm and the bracket. As known in the art, facing surfaces of the stationary and displaceable elements of the tensioner are abutted by respective bearing surfaces. Thus, as can be seen from FIG. 1, a central axial bearing 12' contacting the arm 5' and the bracket 8' is practically a single wear surface which provides stiffness to the whole structure. As demonstrated by practical application of such tensioners, this structure is inadequate and results in a short life of the tensioner. It needs frequent maintenance and, therefore, is neither cost efficient nor practically durable.

SUMMARY OF THE INVENTION

It is therefore an object of the invention to provide a belt tensioner which has superior functional characteristics in terms of vibration.

It is another object of the invention to provide a belt tensioner which has a reliable and large contact surface capable of withstanding vibration.

Still another object of the present invention is to provide a belt tensioner having a plurality of bearings inserted between respective adjacent surfaces of the displaceable and stationary components of the belt tensioner.

The embodiment of the invention described herein is just an example of the inventive concept, and it is to be understood that the various features of the invention can be utilized in various combinations thereof to provide a belt tensioner for other systems as desired.

A belt tensioner according to the invention includes a stationary bracket rigidly mounted at the front of the engine. The bracket is cup-shaped and receives a lever arm which is mounted pivotally on the bracket and is spring-loaded to be tensioned in a belt-tensioning directions toward an endless belt. The bracket and lever arm are provided with a plurality of formations extending toward one another and spaced apart. Such juxtaposition defines a plurality of channels that are filled with at least one U-shaped bearing. The arm supports a pulley carrier that extends so that a fastening element attaching the bracket to the engine does not extend into a volume of the pulley carrier.

According to another embodiment, the channels formed between the stationary bracket and pivotal arm are filled with a pair of coaxial bushings.

Further, the invention provides a continuous surface of the lever arm terminating within a housing of the bracket and forming therewith a compartment, which receives a spring element. Respective surfaces of the components are separated by a spring bearing providing an additional support surface and serving as a guide for the spring element.

BRIEF DESCRIPTION OF THE DRAWINGS

The above and other objects, features and advantages will become more readily apparent from the following detailed description of the invention with references being made to the accompanying drawings, in which.

DETAILED DESCRIPTION OF THE INVENTION

Figure 1:
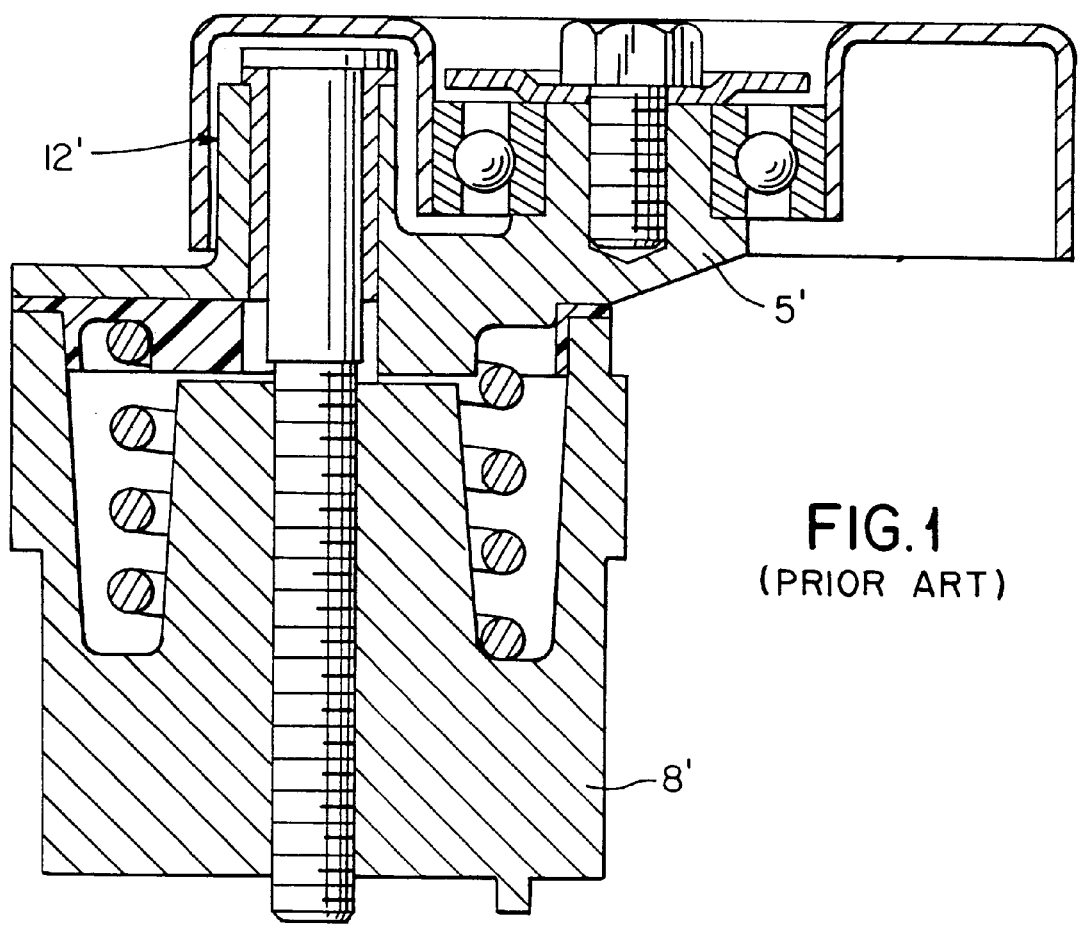
FIG. 1 is a belt tensioner according of the prior art.
Figure 2:
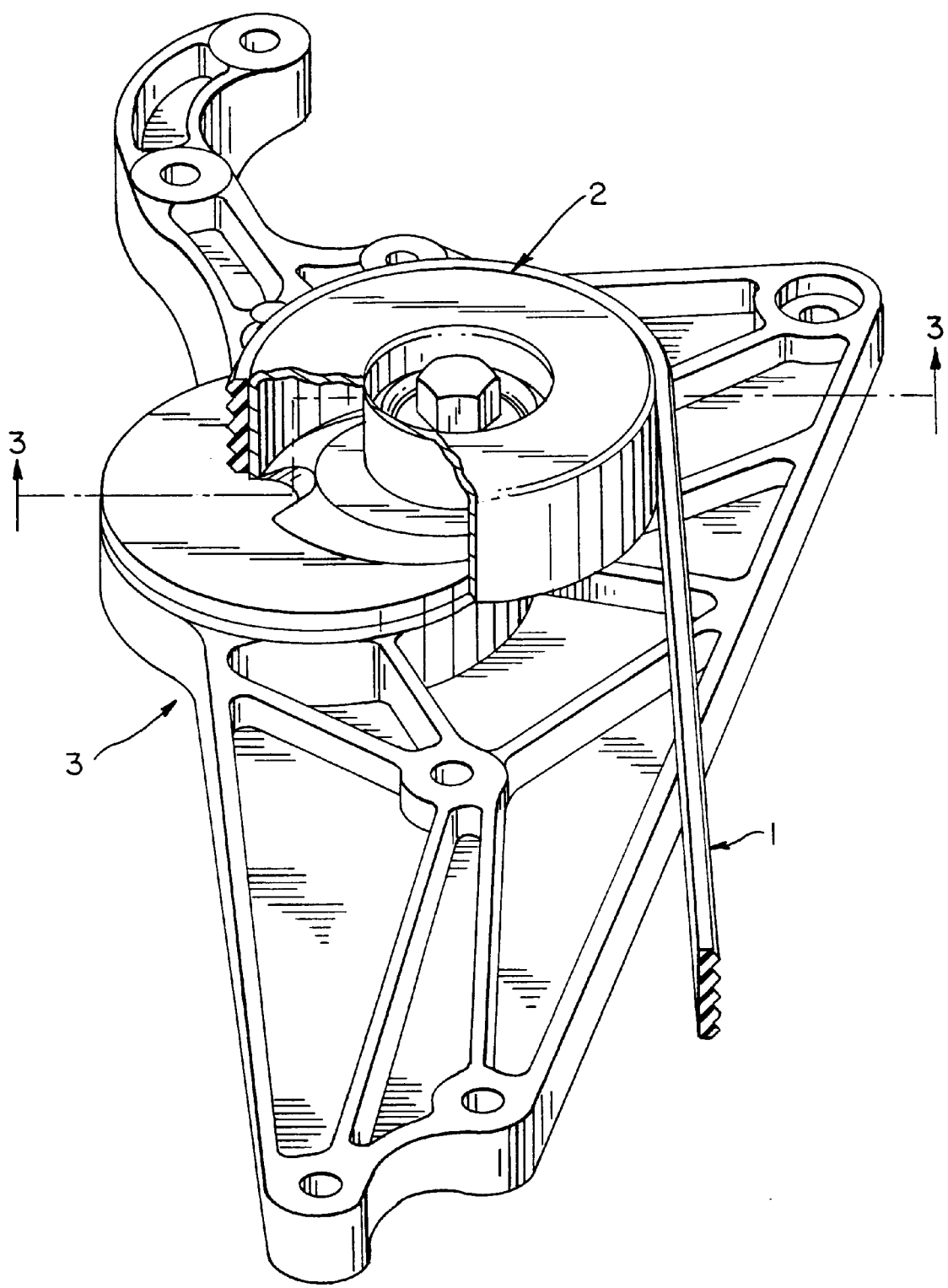
FIG. 2 is an isometric view of a bracket and a belt tensioner according to the present invention.

As illustrated in FIG. 2, a belt tensioner according to the invention is intended for use with an engine of the automotive type or a belt tensioner for such an engine. As mentioned above, various accessories are all driven by a flexible belt 1, which usually receives power from a crankshaft pulley (not shown herein) rotatable with the engine's crankshaft. A tensioner 2 is mounted on a bracket 3 connected to the engine and can be used with the flexible belt 1 of the serpentine type as well of any other type of drive belts or drive systems.

In order to drive the accessories without belt 1 slipping objectionably, it is necessary that the tensioner 2 maintain the belt at a desirable level of tightness. Tensioner 2 meets this requirement by pivoting an arm 5 (FIG. 3) in a belt-tensioning direction, so that a pulley housing 6, which is attached to the arm 5 by a fastening element or fastener 7, tightens the belt 1. Such fastener 7 can be a bolt, a pin or the like which provides the necessary stiffness to the whole structure in response to various vibrations encountered in the operation of the engine.

Figure 3:
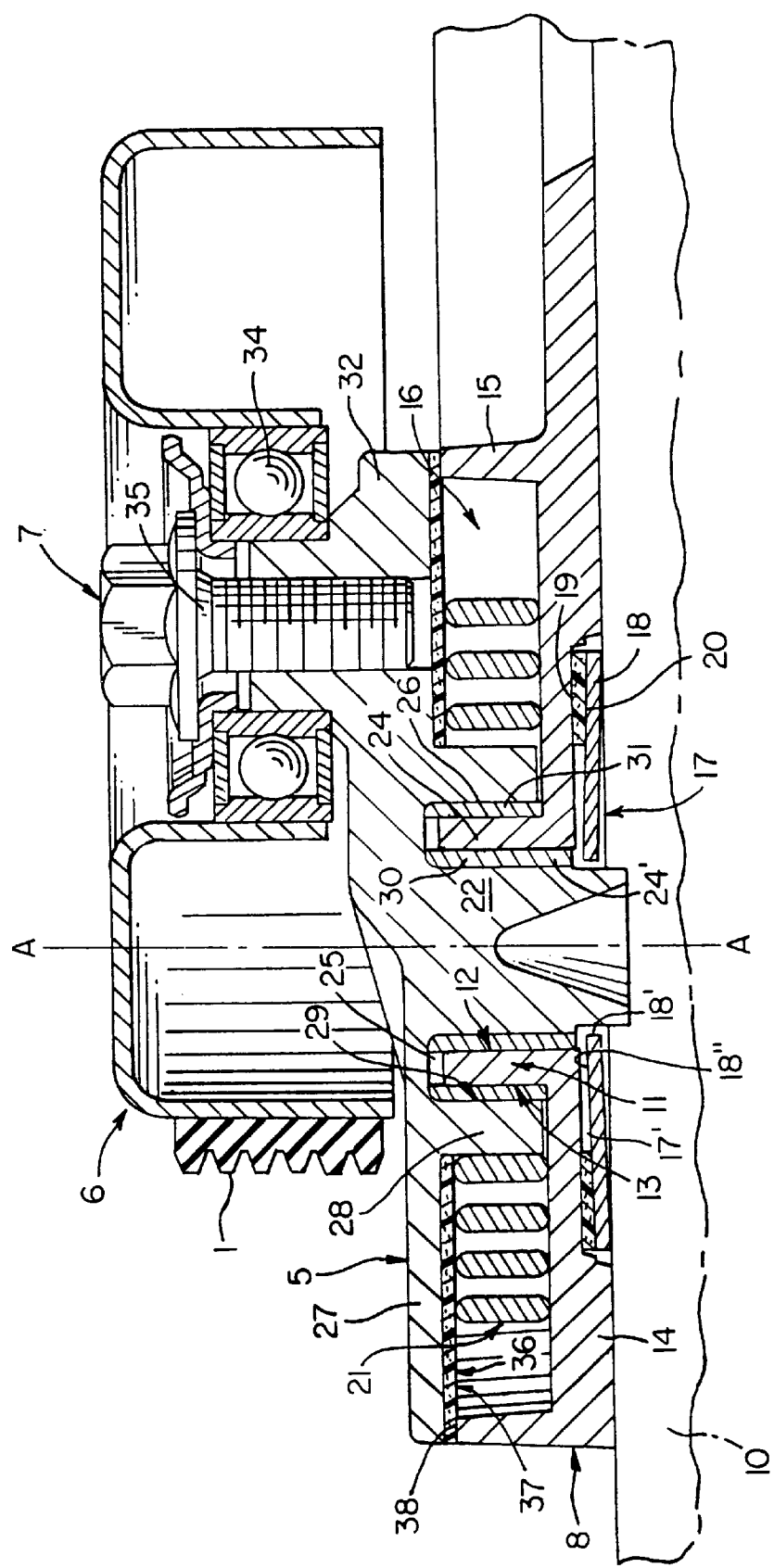
FIG. 3 is a cross-section of the belt tensioner as shown in FIG. 2 of the invention.

The details of structure of a tensioner according to the invention are shown in detail in FIG. 3. The tensioner 2 has a stationary support 8, which is attached to the engine 10 through the bracket 3 by any suitable fastener and extends along an axis A—A. The stationary support 8 includes a hub carrier 11, which is formed integrally with this support 8 and extends towards the housing 6 but terminates at a distance therefrom. Accordingly, the hub 11 has an inner annular surface 12 and an outer annular surface 13 extending axially outwardly from a base 14. Spaced radially outwardly from and formed on the base 14 of the stationary support 8 is an annular outer flange 15 which extends axially outwardly parallel to the hub 11 and forms therewith an annular compartment 16. An inner surface of the base 14 is machined with a recess 17 extending radially outwardly from the hub 11 toward the flange 15.

The recess 17 receives an armplate 18 pressed against the engine and connected to a periphery of the base 14 so as to form a space 17' therewith. This space receives a plate bushing 19 extending radially towards the axis A—A and terminating radially outwardly from an inner edge 18' of the armplate 18. As a result of the space 17', an area of the armplate 18, which is adjacent to the inner edge 18', is capable of deflecting axially outwardly to provide additional stiffness to the whole structure during assembly. Since an outer surface 18" of the armplate 18 facing the base 14 is capable of deflecting with respect to the axis A—A, the plate bushing 19 may be formed with a taper. In other words, the bushing's inner surface 20 may extend complementary to the outer surface 18" of the armplate 18 upon assembly of the tensioner.

Mounted on the stationary support 8 is the arm 5 pivoting about the axis A—A towards the belt 1. As known, the magnitude of tightness of the belt 1 varies in a cyclical manner and is a function of loads imposed thereon. Such cyclical loads tend to cause the belt to vibrate or oscillate and may cause separation between the belt 1 and a belt engaging means. In order to avoid this undesirable separation, a spring 21 received in the annular compartment 16 biases the arm 5 in a belt tensioning direction. Accordingly, the housing 6, which is mounted on and is swingable with the arm, tends to remain in constant contact with the belt 1.

The arm 5 is disposed about the hub 11 of the stationary support 8. Interposed within an inner peripheral surface 12 of the hub 11 is a central shoulder 22 which has an outer periphery 24 spaced radially inwardly from and forming an axial channel 24' with the inner surface 12 of the hub 11. As seen in FIG. 3, the arm further has an annular shoulder 28, which is formed on a flange 27 extending radially outwardly from the central shoulder 22 towards the outer flange 15 of the support 8. The flange 27 terminates in an axial plane of the flange 15 and is spaced axially outwardly therefrom thereby forming a cover for the compartment 16.

Extending laterally from the central shoulder 22 is a lever 32 supporting the housing 6 which is journaled on the lever by means of a bearing 34. The housing 6 is mounted centrally on the lever 32 by a fastener 35 extending parallel to the axis A—A. The lever 32 extends radially from the flange 27 and terminates in an axial plane of the flange 15 of the stationary support 8.

In order to withstand forces resulting from pivoting the arm 5 about the support 8, it is necessary that both elements have increased areas of sliding contact therebetween without compromising dimensions and efficiency of the tensioner.

To meet this requirement, the annular shoulder 28 forms with the arm 5 an annular channel 26 receiving an axial pivotal bushing. Particularly, the annular shoulder 28 has an inner peripheral surface 29 surrounding the outer surface 13 of the hub 11 and spaced radially outwardly therefrom to provide the annular channel 26 that extends parallel to the channel 24'.

According to one aspect of the invention, the channels 26, 24' receive annular pivot bushings 31 and 30 respectively. As a result, contact surfaces between stationary and rotatable parts of the tensioner are increased. Taken together, the bushings 30 and 31 operatively connect the base 14 and the hub 11 of the bracket 8 with shoulders 22 and 28 of the arm 5. All of the mutually engaging surfaces of the above-discussed elements generates a resulting force, which is equal to and counteracts forces acting to displace the arm 5 and the housing 6 out of the plane of belt 1. Having an increased contact area due to a pair of the bushings 31 and 30 improves the proper relationship of the pulley carrier 6 and the arm 5 with respect to the drive belt 1 and the various pulleys over which the belt is trained.

In order to improve the strength inherent in the structure, a spring bushing 36, which is juxtaposed with an inner surface 37 of the lever 32 and flange 27 of the arm 5 and a respective outer surface 38 of the outer flange 15, closes the compartment 16, thereby serving as a support surface for the spring 21.

Figure 4:
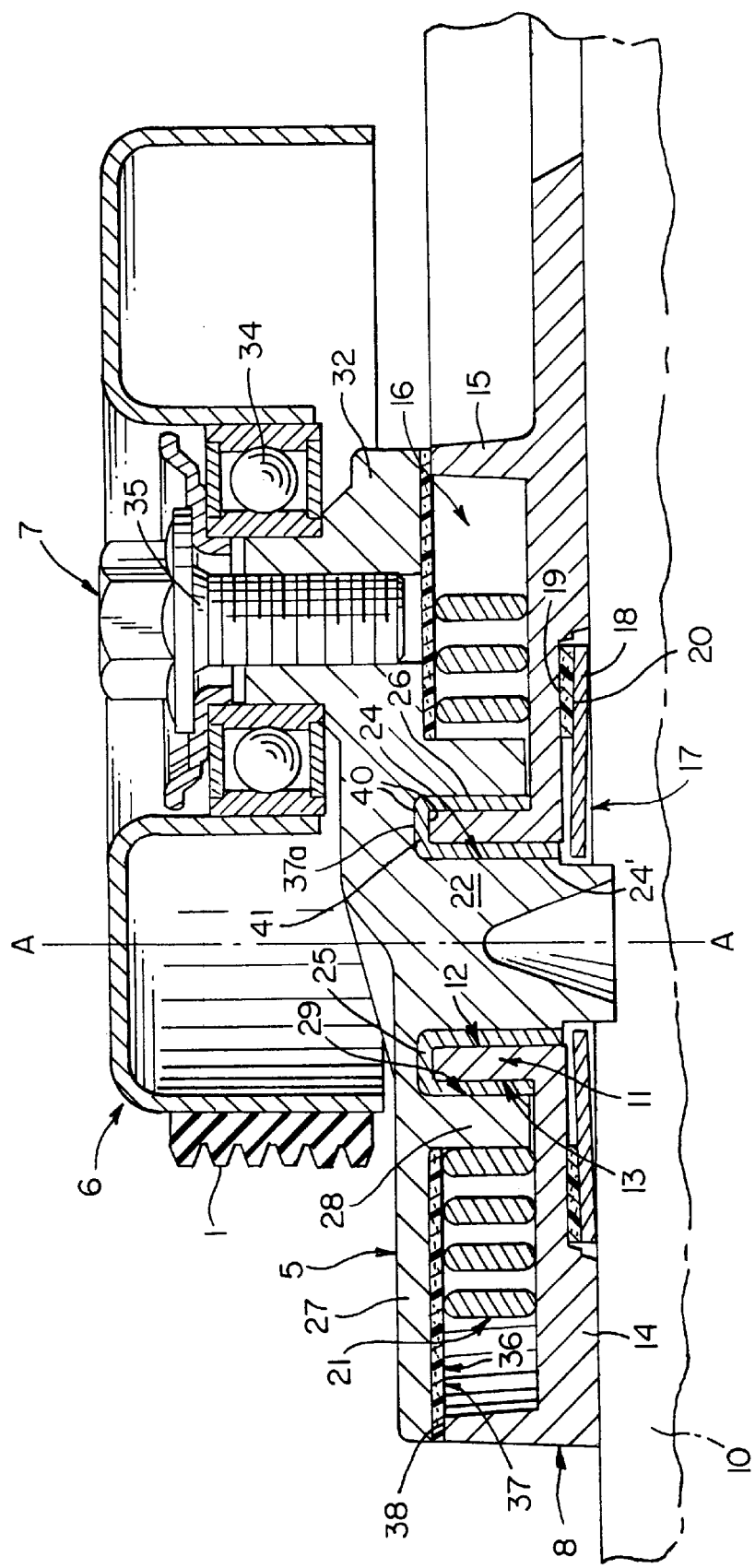
FIG. 4 is a cross-section of the belt tensioner according to another embodiment of the invention.

FIG. 4 illustrates another aspect of the invention teaching a single U-shaped pivot bushing 37a. Since the flange 27 is axially spaced from the hub 11, a radial channel 25 bridges the channels 26 and 24' allowing the U-shaped bushing 37a to fill these two axial channels and the radial channel 25. Such structure further increases an overall contact area between the swingable arm 5 and the stationary support 8 by adding two wear surfaces 40 that extend along a radial portion 41 of the U-shaped bushing 37a.

Artisans skilled in the art will appreciate possible various changes and modifications that may be made to the tensioner described herein without departing from the scope of the invention as defined by the appended claims.

What is claimed is:

1. A belt tensioner for tensioning an endless drive belt of a drive system, said belt tensioner comprising:

a stationary support mounted on an engine and extending along a longitudinal axis;

a lever arm mounted reciprocally swingable on said stationary support about said longitudinal axis in a belt tensioning direction toward an endless drive belt and in an opposite belt releasing direction;

a plurality of members provided between said stationary support and said lever arm, said members being spaced radially apart and extending axially toward and overlapping one another to form a plurality of axial channels therebetween wherein said members include at least one shoulder formed on said stationary support and terminating at a distance from said lever arm, and at least two spaced apart shoulders formed on said lever arm and flanking said one shoulder to form therebetween at least two axial channels and further forming one radial channel which bridges said axial channels;

a spring element operably connected with and resiliently biasing said lever arm in said belt-tensioning direction toward said drive belt;

a pulley assembly mounted on said lever arm and applying a tension force in said belt-tensioning direction; and a bearing element received in said plurality of channels for providing sliding friction between said lever arm and said stationary support upon mounting said lever arm on said support.

2. The belt tensioner defined in claim 1 wherein said bearing element includes a pair of pivot bushings each received in a respective one of said axial channels.

3. The belt tensioner defined in claim 1 wherein said bearing element includes a single U-shaped bushing received by said pair of axial channels and said radial channel.

4. The belt tensioner defined in claim 1 wherein said stationary support is formed with a peripheral wall extending axially outwardly toward said lever arm and forming a housing which receives said spring element with one of said shoulders of said lever arm.

5. The belt tensioner defined in claim 1 wherein said members comprise a pair of shoulders formed on said lever arm, one of said shoulders being centered on said longitudinal axis, said other shoulder being spaced radially outwardly from said one shoulder.

6. The belt tensioner defined in claim 1 wherein said members comprise at least one shoulder formed on said lever arm and terminating at a distance from said stationary support, and at least two spaced apart shoulders formed on said lever arm and flanking said one shoulder to form at least two axial channels and one radial channel which bridges said axial channels, said channels receiving said bearing element upon mounting said lever arm on said stationary support.

7. A belt tensioner for tensioning an endless drive belt, said belt tensioner comprising:

a stationary support member mounted on an engine and extending along a longitudinal axis;

an arm member rotatably mounted on said stationary support member and resiliently biased in a belt tensioning direction towards as endless drive belt wherein said arm member has a groove and said stationary support member has a hub centered on said axis, said hub extending axially outwardly from said engine towards said groove which has a bottom wherein said hub terminates at a distance from said bottom of said groove and forms a radial channel therewith, whereas said radial channel bridges a pair of axial channels receiving the groove being aligned with and receiving said hub during assembly so as to form said pair of axial channels in said groove; and a bearing assembly received in said pair of axial channels for providing sliding friction between said stationary support and arm members.

8. The belt tensioner defined in claim 7 wherein said arm member has a radially extending flange provided with:

a first annular shoulder centered on said axis and extending inwardly towards said engine, and a second annular shoulder coaxial with and spaced radially outwardly from said first shoulder, whereas said first and second shoulders have outer and inner radial walls respectively which form said groove therebetween.

9. The belt tensioner defined in claim 8 wherein said bearing assembly includes a single U-shaped bushing received by said pair of axial channels and further by said radial channel.

10. The belt tensioner defined in claim 7 wherein said bearing assembly includes two pivot bushings each received in a respective one of said axial channels.

11. The belt tensioner defined in claim 7, further comprising a pulley housing mounted on said arm member for swinging in said belt tensioning direction with said arm to apply a tension force on said drive belt.

12. The belt tensioner defined in claim 7 wherein said flange of said arm member has a recessed portion extending radially outwardly from said second shoulder and spaced axially apart from said stationary support member.

13. The belt tensioner defined in claim 11 wherein said pulley housing is axially juxtaposed with said arm member and is spaced axially apart from said stationary support member.

14. The belt tensioner defined in claim 12 wherein said stationary support member has an annular outer wall spaced radially outwardly from said second shoulder of said arm member and extending axially upwardly toward said recessed portion of said flange, so that said outer wall, second shoulder and said recessed portion of said flange combined with one another form a spring housing.

15. The belt tensioner defined in claim 14 wherein said outer wall of said stationary support member terminates at a distance from recessed potion of said arm member to form a space therebetween which receives a spring bushing extending radially outwardly from said second shoulder of said arm member and having an outer radial end which is flushed with said outer wall.

16. The belt tensioner defined in claim, 14 further comprising a spring received in said spring housing and braced against said arm member and said stationary support member to bias said arm member in said belt tensioning direction.

17. A method for assembling a belt tensioner comprising a support mounted stationary on an engine and a lever arm pivotally mounted on said support and being resiliently biased to apply a tensioning force to an endless drive belt, said method comprising the steps of:

providing said support with at least one hub extending along an axis towards said lever arm;

providing said lever arm with at least one annular groove aligned with and receiving said one hub which form a pair of axial channels with inner and outer peripheral walls of said groove, and one radial channel which bridges said axial channel; and providing a bearing assembly which includes a pair of pivot bushings each received in a respective one of said pair of said axial channels or a single U-shaped bushing received by said pair of axial channels and said radial channel for providing sliding friction between said lever arm and said stationary support.

* * * * *